United States Patent
Pankratius (10) Patent No.: US 10,577,041 B2
(45) Date of Patent: Mar. 3, 2020

(54) MOBILE ALARM APPARATUS

(71) Applicant: ABUS August Bremicker Söhne KG, Wetter-Volmarstein (DE)

(72) Inventor: Ernst Pankratius, Wetter (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 0 days.

(21) Appl. No.: 15/991,689

(22) Filed: May 29, 2018

(65) Prior Publication Data
US 2018/0346047 A1 Dec. 6, 2018

(30) Foreign Application Priority Data

May 30, 2017 (DE) .......................... 10 2017 111 833

(51) Int. Cl.
| | | |
|---|---|---|
| *G08B 21/02* | (2006.01) | |
| *B62H 5/20* | (2006.01) | |
| *G08B 13/14* | (2006.01) | |
| *E05B 45/00* | (2006.01) | |
| *E05B 45/06* | (2006.01) | |

(52) U.S. Cl.
CPC .............. *B62H 5/20* (2013.01); *E05B 45/005* (2013.01); *E05B 45/06* (2013.01); *G08B 13/14* (2013.01); *G08B 21/0225* (2013.01); *G08B 21/0233* (2013.01)

(58) Field of Classification Search
CPC ......... B62H 5/20; E05B 45/005; E05B 45/06; G08B 13/14; G08B 21/0225; G08B 21/0233
See application file for complete search history.

(56) References Cited

U.S. PATENT DOCUMENTS

| 5,172,093 A | 12/1992 | Nose et al. |
| 2007/0115101 A1* | 5/2007 | Creekbaum ............. B60R 25/00 340/426.22 |
| 2011/0012729 A1* | 1/2011 | Hess .................. G08B 13/1409 340/539.13 |

(Continued)

FOREIGN PATENT DOCUMENTS

| DE | 4313850 A1 | 11/1994 |
| DE | 102005043927 A1 | 3/2007 |

(Continued)

*Primary Examiner* — Munear T Akki
(74) *Attorney, Agent, or Firm* — Dinsmore & Shohl LLP; Cesare Sclafani (57) ABSTRACT

A mobile alarm apparatus includes a detection apparatus for detecting positional changes of the alarm apparatus; an output apparatus for the output of alarm signals; and a control apparatus for controlling the output apparatus in dependence on detected positional changes. The control apparatus is operable in a monitoring mode and in an alarm mode. In the monitoring mode, the control apparatus is configured to control the output apparatus to output a pre-alarm and to change into the alarm mode when a detected positional change is within a first range of significance. In the alarm mode, the control apparatus is configured to change into the monitoring mode when a predefined time period has elapsed since the last output of an alarm signal and otherwise, when a detected positional change is within a second range of significance, to control the output apparatus to output a main alarm different from the pre-alarm.

20 Claims, 1 Drawing Sheet

(56) References Cited

U.S. PATENT DOCUMENTS

| | | |
|---|---|---|
| 2013/0257616 A1 | 10/2013 | Taylor et al. |
| 2013/0321163 A1 | 12/2013 | Brenner |
| 2014/0266668 A1* | 9/2014 | Blankenship ...... G08B 13/1436 340/501 |
| 2015/0035672 A1* | 2/2015 | Housley ............. G08B 21/0275 340/539.13 |
| 2017/0009491 A1* | 1/2017 | Nguyen .................. E05B 67/10 |
| 2017/0043828 A1* | 2/2017 | Mohamed ................ B62H 5/20 |

FOREIGN PATENT DOCUMENTS

| | | |
|---|---|---|
| DE | 102011012163 A1 | 8/2012 |
| EP | 2469491 A1 | 6/2012 |
| WO | 2013187991 A2 | 12/2013 |

* cited by examiner

MOBILE ALARM APPARATUS

CROSS-REFERENCE TO RELATED APPLICATIONS

This application claims priority to German Patent Application No. 102017111833.0 filed on May 30, 2017, the entire contents of which are incorporated herein by reference.

TECHNICAL FIELD

The present disclosure relates to a mobile alarm apparatus for releasable fastening to a movable object, in particular to a two-wheeler or to a tool.

BACKGROUND

To in particular secure a movable object against theft, the object may, for example, be connected to another, unmovable object. Two-wheelers are thus, for instance, expediently connected, for example by a two-wheeler lock, to an unmovable object such as a bike stand or a lamppost for securing against theft, provided that the two-wheeler lock is configured therefor and that a suitable unmovable object is present. Otherwise, there still remains the possibility of locking up the movable object in itself such that an unauthorized moving away of the object is at least made more difficult and/or such that the object is not usable in the locked up state. A wheel of a two-wheeler to be secured may, for example, be blocked by a two-wheeler lock such that the two-wheeler either may not be used for riding or may not simply be pushed away. Some two-wheeler locks may, in particular when they form a sufficiently large loop in the closed state, be used both for connection and for the described locking up, while frame locks or spoke locks, for example, are configured especially for a locking up in the sense of an inner blocking.

The security of a respective securing device by which a movable object should be secured against being moved away depends on how easily and thus how fast the securing device may be overcome. In principle, any securing device at the latest be overcome by its destruction when someone has uninterrupted access to the securing device for a sufficiently long time for this purpose. It therefore adds to the security of a movable object protected by a securing device when precautions are taken so that breaking open attempts do not remain unnoticed, but are rather in particular signalized by transmission of an alarm.

For this purpose, for instance a two-wheeler lock may have an alarm function, in addition to the function of preventing a moving away of the two-wheeler, so that it represents a mobile alarm apparatus in this respect. A separate mobile alarm apparatus may, however, also be provided that may generally be releasably fastened to the movable object independently of mechanical securing device for connecting or locking up the movable object. Since attention may already be drawn to an attempted theft and the thief may be disturbed by the simple transmission of an alarm signal, the attachment of such a mobile alarm apparatus may be sufficient to prevent an unauthorized moving away of the movable object with a certain reliability. Provided that the mobile alarm apparatus is, however, not anyway integrated in mechanical securing device such as a two-wheeler lock, it is used in addition to such securing device.

In general, a mobile alarm apparatus may be used for securing the most varied objects and is in particular expedient when the object to be secured is a valuable that is typically easily accessible, at least at times, and is transportable. For example, tools or machines that are used on construction sites and are not locked away as a rule may have to be secured overnight. A mobile alarm apparatus may also be used in order, for instance, to secure a toolbox or another container in which the objects actually to be secured are received, e.g. a shed or a locker.

To be able to respond to an unauthorized access to the secured object, the mobile alarm apparatus must be configured to recognize whether an attempt is made to move the movable object away, in particular whether an attempt is made to break open existing securing device. The most general criterion for the presence of such an attempt comprises mechanical influences taking place on the alarm apparatus. In general, any influence by which the position of the alarm apparatus is changed may be an indication of a break-open attempt. While such mechanical influences may be recognized comparatively simply, this does not in contrast apply to the respective cause of the mechanical influences. This has the result that mechanical influences that have a different cause than a break-open attempt also result in an alarm. For example, a movement of the alarm apparatus that may be caused by a strong wind may already not be distinguished from a break-open attempt. In addition, the movable object to be secured may, for instance, also experience a vibration without a break-open attempt having to be present, for instance when someone accidentally brushes against a connected two-wheeler or moves it slightly in order e.g. to connect a further two-wheeler next to it.

The fact that actual break-open attempts are difficult to distinguish from random or harmless influences results in a high probability of false alarms. Since the alarm signal transmitted to signalize a break-open attempt and to disturb the thief is expediently very loud and thus may also be unpleasant depending on the proximity to the alarm apparatus, such false alarms must be avoided as much as possible. When false alarms occur too frequently, this may have the consequence that the alarm apparatus is no longer used at all, whereby the securing of the movable object actually to be achieved is made worse.

SUMMARY

It is the object of the present disclosure to provide a mobile alarm apparatus for releasable fastening to a movable object, in particular to a two-wheeler, that has a reduced susceptibility to the transmission of loud and disturbing false alarms.

The object is satisfied by a mobile alarm apparatus having the features disclosed in the following description and the Figures.

In some embodiments, the mobile alarm apparatus comprises a detection apparatus for detecting positional changes of the alarm apparatus; an output apparatus for outputting alarm signals; and a control apparatus for controlling the output apparatus in dependence on detected positional changes. The mobility of the alarm apparatus and its releasable fastening to a respective movable object make it possible to take along the alarm apparatus in everyday life and to use it flexibly to secure varied movable objects. The fastening may take place in different manners in this way. For example, the alarm apparatus may be configured to be connected to the respective object in the manner of a two-wheeler lock or a padlock. The fastening may, however, also take place by a screw connection or an adhesive connection, by a clip, magnetically and/or by a hook and loop connection. In general, a force-transmitting arrangement, e.g. a clamped fit, of the alarm apparatus at the respective object may also be sufficient, for example in that the alarm apparatus is inserted and clamped in a seat tube of a two-wheeler. The alarm apparatus is in this respect at least fastened to the movable object such that it moves along with positional changes of the object.

Movements and/or accelerations of the alarm apparatus in one or more linear directions and/or one or more directions of rotation may, for example, be detectable as positional changes of the alarm apparatus by the detection apparatus. For example, the detection apparatus may be an accelerometer that may dynamically detect accelerations in three different spatial directions. One or more of the accelerations thus detected may then be used directly as positional changes in dependence on which the control apparatus may control the output apparatus to output alarm signals. The detected positional changes may, however, also be derived therefrom, for instance when the positional changes are changes of orientation that are defined by one or more angles of rotation with regard to respective axes of rotation. Such changes of orientation may alternatively or additionally also be detected by one or more gyroscopes. The detection apparatus may furthermore be configured to detect the direction of one or more static accelerations such as gravity in the manner of a tilt sensor. In addition or also alternatively in this respect, a change of the azimuthal angle may be taken into account, for instance in that the detection apparatus comprises a compass device.

Not only a change of the orientation of the alarm apparatus may, however be detectable as a positional change of the alarm apparatus by the detection apparatus, but also a change with respect to the position of the alarm apparatus in space. For this purpose, the detection apparatus may e.g. be configured in the manner of a GPS receiver to determine the position of the alarm apparatus using received signals. when a technique is used for detecting positional changes of the alarm device by which a position or an orientation of the alarm apparatus may be determined, but not the distance or the angle of the positional change, but rather the speed and/or the acceleration of a change of position or orientation, these parameters may be determined by differentiation over time.

The control apparatus takes account of the detected positional changes of the alarm apparatus as a criterion of whether an alarm should be triggered, i.e. whether the output apparatus should be controlled to output an alarm signal, or not. In this respect, either a deviation from a starting value, that is for example a distance covered or an angle of rotation that has been passed through, or also the current degree of change, optionally averaged over a time window, that is, for instance, the speed or angular speed or the acceleration or angular acceleration may be used as a measure for a respective positional change that is compared for this decision, for example, with a threshold value or with a value range defined by two limit values.

The output apparatus is controlled to output an alarm signal in response to a detected positional change that indicates an unauthorized influence on the alarm apparatus or on the movable object to which the alarm apparatus is fastened. In general, in this respect it may be any kind of signal that is suitable to signalize the determination of a possible unauthorized influence to the outside. In some embodiments, the output apparatus is configured to output acoustic alarm signals.

In accordance with the present disclosure, the control apparatus is operable in a monitoring mode and in an alarm mode. In this respect, the control apparatus is configured in the monitoring mode to control the output apparatus to output a pre-alarm and to change into the alarm mode when a detected positional change is within a first range of significance. The control apparatus is furthermore configured in the alarm mode to change into the monitoring mode when a predefined time period has elapsed since the last output of an alarm signal and otherwise, when a detected positional change is within a second range of significance, to control the output apparatus to output a main alarm different from the pre-alarm.

In other words, respective positional changes of the alarm apparatus are detected and checked with respect to whether they allow a conclusion on an unauthorized influence both in the monitoring mode and in the alarm mode. It is respectively determined for this purpose whether the respective positional change is within a predefined range of significance or not, with a first range of significance being decisive in the monitoring mode and a second range of significance, which may be different, being decisive in the alarm mode. In addition, the alarm signal that may have been output in the monitoring mode differs from the alarm signal that may have been output in the alarm mode, with the alarm signal only being a pre-alarm in the one case of the monitoring mode and a main alarm in the case of the alarm mode.

In some embodiments, the main alarm has a greater range than the pre-alarm and/or signalizes a greater urgency than the pre-alarm. The main alarm may in particular differ from the pre-alarm in that the main alarm has a different, in particular a greater, duration, volume, pitch and/or modulation frequency than the pre-alarm. The pre-alarm may, for example, have a duration of approximately 3 seconds; the main alarm may have a duration of 20 seconds, for example. In addition, the main alarm may have a sound pressure level of at least approximately 80 dB, at least approximately 90 dB, in particular at least approximately 100 dB, at a distance of approximately 0.3 m or of approximately 0.5 m from the output apparatus. The pre-alarm may have the same sound pressure level as the main alarm or may also have a sound pressure level that is, for example, lower than that of the main alarm by at least approximately 10 dB or at least approximately 20 dB.

Provision may furthermore be made that no further positional changes of the alarm apparatus are detected during the transmission of the pre-alarm and/or of the main alarm or that detected positional changes are at least not evaluated so that the rules for the monitoring mode and the alarm mode are suspended for the duration of the pre-alarm and/or of the main alarm. In some other embodiments, the predefined time period after whose elapse the control apparatus changes back into the monitoring mode relates to the point in time of the end of the last output of an alarm signal.

While the main alarm may generally substantially correspond to the alarm signal of conventional alarm apparatus, the pre-alarm is lessened in comparison therewith and thus acts less as a regular alarm and more as a warning. It is thus possible to initially respond to a sufficiently significant positional change of the alarm apparatus with reduced intensity due to the pre-alarm before, optionally subsequently, e.g. when the positional change increases or when the positional change continues, the main alarm is triggered.

The triggering of a main alarm that is in particular loud and is in particular unpleasant under certain circumstances is thus preceded by a preliminary stage by which it is prevented that every positional change that is not just sub-threshold immediately triggers a main alarm. Instead, a check is first made as the requirement for the triggering of the main alarm whether a detected positional change is within the first range of significance and subsequently whether a further positional change is within the second range of significance. The main alarm is delayed in this manner and a two-stage check, that thus better precludes false alarms, of the significance of a respective positional change is achieved with a suitable choice of the ranges of significance.

However, so that the delay of the main alarm by the two-stage check does not provide a thief with any additional time, an alarm signal is also output in the monitoring mode when a positional change is determined in the first range of significance, even when it is only a pre-alarm. Such a pre-alarm is less disturbing in the event of a false alarm than an immediate main alarm would be. At the same time, the pre-alarm may already draw attention to the movable object to which the alarm apparatus is fastened, albeit less reliably than the main alarm, in the event of an attempted theft and may thereby thwart the theft. In addition, it is signalized to a thief by the pre-alarm as a kind of warning that when he continues to influence the movable object or the alarm apparatus fastened thereto, he has to anticipate a regular alarm, whereby the thief may be deterred. In this manner, a theft may also be thwarted under certain circumstances without the main alarm having to be triggered at all so that a disturbance of the general public by the loud main alarm not only takes place less often with false alarms, but also in an actual alarm case.

The two-stage design of the check of whether a main alarm is triggered is in particular produced in that the control apparatus only changes into the alarm mode when a positional change has previously been detected in the monitoring mode that falls into the first range of significance and when additionally a further positional change that falls into the second range of significance is detected within a certain predefined time period in the then following alarm mode. In contrast when no such positional change is detected within this time period, the control apparatus changes back into the monitoring mode without a main alarm being output. Since the movable object to be secured is stationary as a rule, the monitoring mode so-to-say represents the normal state of the control apparatus as long as the movable object does not experience any mechanical influences from outside. The control apparatus is in particular initially, e.g. after a switching on or activation of the alarm apparatus, first operated in the monitoring mode. In the alarm mode, the control device is in contrast respectively only operated temporarily, namely only after a positional change has been detected that is within the first range of significance and subsequently only for so long until said predefined time period since the respective last output of an alarm signal has elapsed.

The requirement for a pre-alarm or a main alarm to be output is in each case that positional changes are continuously detected and a check is made whether a respective detected positional change is within the first range of significance or the second range of significance. In accordance with some embodiments, the detected positional change is within a respective range of significance when a measure (i.e. a measured value) corresponding to the positional change is larger than or no smaller than a minimal value of the respective range of significance and is optionally smaller than or no larger than a maximum value of the respective range of significance. The measured value may in particular, as already explained above, be a distance measurement or an angular measurement, a speed or an angular speed or an acceleration or an angular acceleration. A respective detected positional change may therefore in particular be given as a numerical value that may be compared with limit values of the range of significance for determining whether the positional change is within a respective range of significance.

Both the first range of significance and the second range of significance have at least one minimal value in this respect. When a respective range of significance is only bounded by this minimal value, it is upwardly open, i.e. the range of significance comprises all the values that are larger than or no smaller than the minimal value. For example, both the first range of significance and the second range of significance may be upwardly unlimited and may only have a minimal value that may be different or also identical for both the first range of significance and the second range of significance. The first range of significance may, however, in particular also have a maximum value that upwardly bounds the range of significance so that the positional change is exactly within this range of significance when the measure corresponding to the positional change is larger than or no smaller than the minimal value and is additionally smaller than or no larger than the maximum value. The second range of significance may have a maximum value so that in the alarm mode any positional change that is larger than or no smaller than the minimal value of the second range of significance results in a main alarm.

The first range of significance and the second range of significance may be fixedly predefined in the alarm apparatus. The minimal values of the first range of significance and the second range of significance and optionally also the maximum value of the first range of significance may in particular be stored in a memory readable by the control apparatus of the alarm apparatus for this purpose. In this respect, the first range of significance and the second range of significance may also be adjustable, for instance in that the minimal value and/or the maximum value of a respective range of significance may be substantially freely changed or may be selected from a plurality of predefined possible values at least within a certain framework. A user may adapt the trigger sensitivity of the alarm apparatus as required in this manner.

In general, the first range of significance and the second range of significance may overlap one another and may even be at least substantially congruent, that is also approximately completely identical. When the first range of significance and the second range of significance have the same minimal value, the trigger sensitivity of the alarm apparatus in the monitoring mode does not differ from that in the alarm mode. Whether a pre-alarm or a main alarm is triggered is then not distinguished with respect to the strength of the respective detected positional change, but only with respect to whether a pre-alarm had previously already been output within said predefined time period and whether the control apparatus is therefore in the alarm mode.

In accordance with some embodiments, the minimal value of the first range of significance is smaller than the minimal value of the second range of significance. In this manner, different trigger sensitivities may be set for the output of the pre-alarm in the monitoring mode and for the output of the main alarm in the alarm mode. In addition, the provision of such different ranges of significance already makes it possible in the monitoring mode to respond to positional changes of different degrees in different manners, as will be explained in the following.

If the minimal value of the second range of significance is larger than the minimal value of the first range of significance, the second range of significance may be a subset of the first range of significance, in particular when the first range of significance is not upwardly bounded. In contrast when the first range of significance has a maximum value, the first range of significance and the second range of significance may also be disjunctive. In some embodiments, the maximum value of the first range of significance corresponds to the minimal value of the second range of significance. In this manner, the first range of significance and the second range of significance are seamlessly adjacent to one another so that no positional changes may be detected that are disposed between the first range of significance and the second range of significance. In some embodiments, the second range of significance is not upwardly bounded. Every non-subthreshold positional change, that is every positional change whose associated degree is larger than or no smaller than the minimal value of the first range of significance may then thus be unambiguously associated with one of the two ranges of significance.

When the measured value used for the determination of whether a positional change is within a respective range of significance is an angular measure, the minimal value of the first range of significance is at least approximately 2° and at most approximately 10°, for example approximately 4°, and/or the minimal value of the second range of significance is at least approximately 12° and at most approximately 20°.

In accordance with some embodiments, the predefined time period after whose elapse the control apparatus changes from the alarm mode into the monitored zone amounts to approximately 3 seconds or approximately 5 seconds. This time period forms a kind of time window within which a check is made after an output of an alarm signal whether a further significant positional change is detected. This time period may in this respect also be dependent on what kind of alarm signal was last output. For example, it may amount to approximately 3 seconds when the last output alarm signal is the pre-alarm and may amount to approximately 5 seconds when the last output alarm signal is the main alarm. The predefined time period may also be adjustable to be able to adapt the respective duration of the alarm mode.

In some embodiments, the first range of significance may not represent the criterion of whether a pre-alarm is triggered or the pre-alarm is not triggered in the monitoring mode. However, it does not follow on from this that, when a positional change detected in the monitoring mode is outside the first range of significance, no reaction at all necessarily occurs. It may in particular be expedient when the first range of significance is upwardly bounded by a maximum value to respond to positional changes above the first range of significance for instance by a direct triggering of a main alarm and a change into the alarm mode.

In accordance with some embodiments of the alarm apparatus, the control apparatus may specifically be configured in the monitoring mode, when a detected positional change is not within the first range of significance, but is within the second range of significance, to control the output apparatus to output the main alarm and to change into the alarm mode. Two possibilities of how the output of a main alarm may take place are thus provided in this embodiment. On the one hand, a main alarm is output when a pre-alarm had been previously output in the monitoring mode as a result of a positional change corresponding to the first range of significance and when a positional change corresponding to the second range of significance is detected in the subsequent alarm mode. On the other hand, a main alarm may, however, also be triggered directly from the monitoring mode in the some embodiments, namely when such a strong positional change is already detected in the monitoring mode that it exceeds the first range of significance, but is within the second range of significance that may be upwardly unlimited.

In some embodiments, when a positional change within the first range of significance is detected in the monitoring mode, the pre-alarm is output and a change into the alarm mode is made in which then a response is made to a detected positional change within the second range of significance by the main alarm. When, however, a positional change is detected within the predefined time period in the alarm mode that is only within the first range of significance, but not within the second range of significance, provision may be made for the avoidance of possible false alarms that, as with a sub-threshold positional change, no alarm signal is output. However, the fact that a positional change associated with the first range of significance is detected in alarm operation may also be evaluated as an indication of an unauthorized influencing of the movable object to be secured or of the alarm apparatus.

In some embodiments, the control apparatus may be configured to control the output apparatus to output a pre-alarm in the alarm mode when the predefined time period since the last output of an alarm signal has not yet elapsed and a detected positional change is within the first range of significance, but not within the second range of significance. Alternatively to the transmission of a further pre-alarm, a positional change within the first range of significance may also be responded to by the transmission of a main alarm in the alarm mode. A further alternative response possibility additionally comprises admittedly not outputting an alarm signal, but resetting the time period such that the control apparatus only changes into the monitoring mode again as soon as for the first time every detected positional change was neither within the first range of significance nor within the second range of significance for the duration of the predefined time period.

In some embodiments, the control apparatus is configured to start the monitoring mode subsequent to an activation of the alarm apparatus so that a positional change in the first range of significance is always initially responded to by a pre-alarm before a main alarm is possibly also triggered with continued positional changes. The activation of the alarm apparatus may take place in very different manners in this respect. For example, the alarm apparatus may have an actuation element, for instance in the form of a push button, by whose actuation the alarm apparatus is activated. The activation of the alarm apparatus may, however, also be effected by external devices to the alarm apparatus, e.g. by a remote control or in that the alarm apparatus is connected to a securing system or control system, for example via a communications bus to an e-bike control system, so that the alarm apparatus may be activated thereby.

Since the fastening of the alarm apparatus to a respective movable object is releasable, it does not have to be defined for a specific object, but may be suitable for different objects. The alarm apparatus may, for example, be integrated into a two-wheeler lock and may be configured for use with two-wheelers of different types. However, an alarm apparatus configured separately, that is generally independently, of such a mechanical securing apparatus may be used largely universally for different movable objects to be secured. In some embodiments, the alarm apparatus comprises a closable fastener that releasable fastens the alarm apparatus to the respective movable object. The closable fastener may also be latchable or latch automatically in the closed state in which the closable fastener holds the alarm apparatus at the respective movable object to prevent an unauthorized release of the alarm apparatus from the respective movable object. A key or another secret code may then be necessary to open the closable fastener. In general, the release of the alarm apparatus from the respective object may, however, also be prevented in that the alarm apparatus is arranged in an inaccessible and/or hidden manner at or in the object.

In some other embodiments, the control apparatus is configured to automatically start the monitoring mode subsequent to a closing of the closable fastener that may also comprise a latching of the closable fastener after the elapse of a predefined waiting time. The alarm apparatus then does not have to be started manually by an actuation provided separately for the activation of the alarm function. It is rather sufficient to fasten the alarm apparatus to the movable object to be secured by the closable fastener, whereby the monitoring mode is automatically put into operation.

The deactivation may generally take place in a similar manner to the activation of the alarm apparatus, e.g. by actuation thereof or also of another actuation element, for instance a push button, or automatically as a consequence of the opening of the closable fastener. Protection against an unauthorized deactivation of the alarm apparatus is provided in this respect. When the alarm apparatus is automatically deactivated on the opening of the closable fastener, the deactivation may already be secured by the secret code for opening the closable fastener. A separate secret code may, however, also be provided for the deactivation of the alarm apparatus. The deactivation may, for example, require the input of a numerical code or the use of an associated remote control. The secret code may also only comprise knowing where the actuation element provided for the deactivation is arranged in a hidden manner. It is furthermore known for electrically driven two-wheelers to unlock them and/or to put them into operation in that a releasable display and/or operating unit ("speedometer") is connected. An unblocking of a two-wheeler taking place in this manner may then simultaneously be used to deactivate an alarm apparatus used at this two-wheeler.

In some embodiments, a predefined waiting period is observed between the closing of the closable fastener or another activation of the alarm apparatus and the start of the monitoring mode. It may thereby be avoided that positional changes of the alarm apparatus that are still caused by the activation or closing or by a subsequent orientation (e.g. due to gravity) of the alarm apparatus immediately result in an alarm. The predefined waiting time may amount to approximately 3 seconds, for example. The predefined waiting time may generally also be adjustable so that a user may adapt it to his requirements.

In some embodiments, the control apparatus is furthermore configured to control the output apparatus to output a start signal on the starting of the monitoring mode. Such a start signal may confirm the functionality of the alarm apparatus to a user of the alarm apparatus. The user may thereby, for example, simultaneously implicitly receive feedback on whether the closable fastener of the alarm apparatus have been correctly closed and optionally latched, whether the alarm apparatus is sufficiently provided with energy, and whether a positional change of the alarm apparatus from the point in time of the start signal onward may result in an alarm.

In some other embodiments, the predefined waiting time between the closing of the closable fastener and the starting of the monitoring mode is dependent on a charge state of an energy source of the alarm apparatus. The energy source may in particular be a battery or a repeatedly rechargeable battery. In such an embodiment, the waiting time may thus be used as an indication of the charge state of the energy source. For example, after a closing of the closable fastener or after another activation of the alarm function, a check may first be made whether a sufficient charge state is present. In such a case, the monitoring mode is started after e.g. approximately 3 seconds; when the charge state is in contrast not sufficient, which may be determined, for instance, in that a voltage output by the energy source is beneath a threshold value, the monitoring mode is only started after e.g. approximately 6 seconds. The user of the alarm apparatus may in particular determine the delayed start of the monitoring mode with reference to the start signal so that the user is informed of the low charge state and may replace or charge the energy source.

In general, a low charge state may, however, also optionally be signalized to a user of the alarm apparatus in addition to an extended waiting time. For example, in the event of a low charge state within the waiting time, a warning signal may be output e.g. in that the output apparatus is controlled to output three short consecutive warning sounds.

It may furthermore be expedient also to provide a delay time between the detection of a positional change and a transmission of an alarm signal possible triggered thereby so that the respective alarm signal may be output with a delay, e.g. of approximately 0.5 seconds. The delay time may, for example, be used to evaluate the detected positional change. It may in particular be necessary first to determine a measured value for the positional change by calculation. It may e.g. comprise a numerical differentiation for which two or more detected positional changes are used, for instance when a speed or an angular speed or an acceleration or an angular acceleration has to be calculated from a sequence of positions or orientations. The delay time may furthermore, for example, be used to compensate measurement inaccuracy in that mean values are formed over a plurality of detected positional changes.

BRIEF DESCRIPTION OF THE DRAWINGS

The present disclosure will be described in the following only by way of example with reference to the Figures.

DETAILED DESCRIPTION

Figures 1, 2:
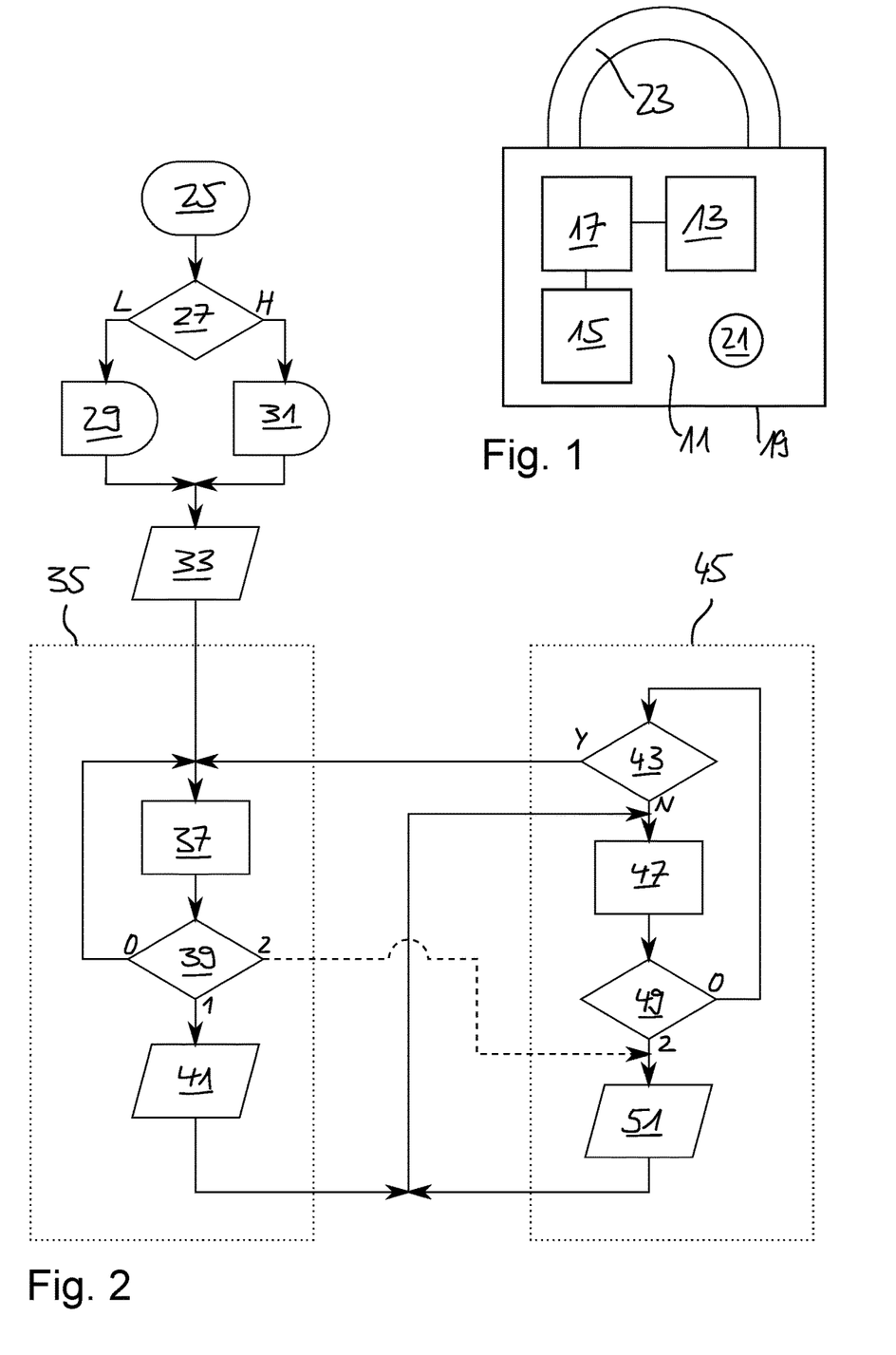
FIG. 1 shows an embodiment of an alarm apparatus in accordance with the present disclosure in a schematic representation.
FIG. 2 shows a flowchart that illustrates the routine in accordance with which the control apparatus controls the output apparatus to output alarm signals in dependence on positional changes of the alarm apparatus detected by the detection apparatus.

The alarm apparatus 11 shown in FIG. 1 comprises a detection apparatus 13, an output apparatus 15, and a control apparatus 17 that are received together in a housing 19 of the alarm apparatus 11. The control apparatus 17 is connected, on the one hand, to the detection apparatus 13 to receive positional changes of the alarm apparatus 11 detected by the detection apparatus 13 and is connected, on the other hand, to the output apparatus 15 to control the output apparatus 15 to output alarm signals and optionally further signals in dependence on the detected positional changes.

The detection apparatus 13 is configured as an accelerometer that detects accelerations of the alarm apparatus 11 in three spatial directions pairwise perpendicular to one another as a respective positional change. The control apparatus 17 is configured to derive an angular measurement therefrom that corresponds to a change of the orientation of the alarm apparatus 11. In some other embodiments, the detection apparatus 13 may be configured as a one or more gyroscopes, a tilt sensor, a compass device, and/or a GPS receiver. In accordance with the flowchart shown in FIG. 2, the control apparatus 17 checks the detected positional changes with respect to whether they are within a first range of significance or within a second range of significance and optionally controls the output apparatus 15 to output a pre-alarm in the form of an alarm sound having a duration of approximately 3 seconds or a main alarm in the form of an alarm sound having a duration of approximately 20 seconds. The output apparatus 15 is configured as an acoustic signal generator for this purpose.

For the energy supply of the alarm apparatus 11, a battery is furthermore provided in the housing 19 as an energy source 21 which supplies the detection apparatus 13, the output apparatus 15, and the control apparatus 17 with power. In addition, the alarm apparatus 11 has a closable fastener 23 that is shown purely schematically as a closed hoop that is suitable to fasten the alarm apparatus 11 to a movable object. In some embodiments, the closable fastener 23 may also fasten the alarm apparatus to the movable object by a screw connection, an adhesive connection, a clip, a magnetic connection, a hook and loop connection member, and/or a force-transmitting arrangement, e.g. a clamped fit, of the alarm apparatus 11 at the movable object may also be sufficient, for example in that the alarm apparatus 11 is inserted and clamped in a seat tube of a two-wheeler. In some embodiments, the closable fastener 23 fastens the alarm apparatus 11 to the movable object such that the alarm apparatus moves along with positional changes of the movable object.

The control apparatus 17 of the alarm apparatus 11 is configured to control the output apparatus 15 in accordance with the flowchart shown in FIG. 2 to output alarm signals in dependence on detected positional changes as a consequence of a closing of the closable fastener 23 that may also comprise a latching of the closable fastener 23 in the closed state. The routine of the control will be explained in the following with reference to the flowchart.

The routine begins with the start step 25 that is, for example, triggered by the closing of the closable fastener 23; but may also have to be triggered in another embodiment of the alarm apparatus 11 by a different kind of activation of the alarm apparatus 11. After the start, the charge state of the energy source 21 is first checked in the decision step 27 in that an output voltage of the energy source 21 is compared with a threshold value that amounts, for example, to approximately 2.6 volts. Depending on whether the charge state is low (L) or high (H), the delay step 29 or the delay step 31 is carried out, with the delay step 29 corresponding to a waiting time of approximately 6 seconds and with the delay step 31 corresponding to a waiting time of approximately 3 seconds. Both delay steps 29, 31 are followed by the same start signal output step 33 in which the control apparatus 17 controls the output apparatus 15 to output a start signal that signalizes the actual start of the alarm function of the alarm apparatus 11. A user of the alarm apparatus 11 may recognize that the energy source 21 has to be charged or replaced by the delay between the closing of the closable fastener 23 and the start signal which is considerably longer with a low charge state. The decision step 27 with the mutually alternative delay steps 29, 31 and/or the start signal output step 33 may, however, also be omitted when no check of the charge state is required or when a low charge state should be indicated or responded to in a different manner.

The control apparatus 17 is subsequently operated in the monitoring mode 35 that is symbolized as a dotted rectangle and that covers the steps 37, 39, 41 framed by the rectangle. The monitoring mode 35 that corresponds to a normal state of the alarm apparatus in this respect is thus necessarily first started by the closing of the closable fastener 23, In the monitoring mode 35, a current positional change of the alarm apparatus 11 is detected in each case by the detection apparatus 13 in the detection step 37. In this respect, the detection may also comprise determining that the position of the alarm apparatus 11 has not changed so that the measure corresponding to this positional change amounts to zero.

The detection step 37 is respectively followed by the decision step 39 in which a check is made whether the detected positional change is within the first range of significance. For this purpose, the measured value that corresponds to the positional change and that the control apparatus 17 receives from the detection apparatus 13 or optionally derives from the detection apparatus 13 is compared with a minimal value of the first range of significance and optionally also with a maximum value of the first range of significance. The measured value of the positional change used for the comparison is, for example, an angular measure and the minimal value of the first range of significance amounts, for example, to approximately 4°. The first range of significance may be upwardly unlimited. In some embodiments, the first range of significance, however, has a maximum value that amounts, for example, to approximately 12°.

When the positional change is within the first range of significance (1), the pre-alarm output step 41 in which the control apparatus 17 controls the output apparatus 15 to output the pre-alarm follows the decision step 39, with the pre-alarm, for example, being an alarm sound having an alarm duration of approximately 3 seconds. When the measured value of the positional change is, in contrast, smaller than the minimal value of the first range of significance (0), the control apparatus 17 respectively returns to the detection step 37.

The detection step 47 that is not associated with the monitoring mode 35, but rather with the alarm mode 45, follows the pre-alarm output step 41. The detection of a positional change that is within the first range of significance therefore does not have the consequence in the monitoring mode 35 that the pre-alarm is output, but also that the control apparatus 17 changes into the alarm mode 45 that is in turn symbolized as a dotted rectangle and that comprises the steps 43, 47, 49, 51 framed by the rectangle.

The detection step 47 of the alarm mode 45 substantially corresponds to the detection step 37 of the monitoring mode 35 since a positional change is also detected by the detection apparatus 13 in the detection step 47 and a check is subsequently made in the decision step 49 whether the detected positional change is within a specific range of significance. However, a different range of significance is used for the comparison in the alarm mode 45, namely the second range of significance that may be generally identical to the first range of significance, or the second range of significance may have a larger minimal value than the first range of significance and the second range of significance may also be upwardly unlimited. The minimal value of the second range of significance amounts, for example, to approximately 12° and may be identical to the maximum value of the first range of significance. The two ranges of significance may, however, also overlap.

When it is determined in the decision step 49 that the positional change detected in the preceding detection step 47 is within the second range of significance (2), the main alarm output step 51 is output in which the control apparatus 17 controls the output apparatus 15 to output a main alarm, wherein the main alarm is, for example, an alarm sound having an alarm duration of approximately 20 seconds. When the detected positional change is in contrast not within the second range of significance (0), a decision is made with reference to the further decision step 43 whether the alarm mode 45 is continued with the detection step 47 or whether the detection step 37 in the monitoring mode 35 is returned to.

A check is made for this purpose in the decision step 43 whether a predefined time duration has elapsed since the last output of an alarm signal, with this time duration amounting, for example, to approximately 5 seconds. In addition, the time duration may depend on the kind of the last output alarm signal. When the time duration has already elapsed (Y), the control apparatus 17 returns to the detection step 37 and thus to the monitoring mode 35. As long as this time period has, however, not elapsed (N), the alarm mode 45 is continued in that the next positional change is in turn detected in the detection step 47 and is checked with respect to its significance in the decision step 49.

The decision step 43 may generally also be provided at another point than that shown in FIG. 2 within the alarm mode 45. The check whether the predefined time duration has elapsed since the last output of an alarm signal may namely, for example, also take place between the detection step 47 and the decision step 49 without the function of the alarm apparatus 11 thereby substantially changing. Unlike as shown in FIG. 2, the decision step 43 may first also be carried out after the pre-alarm output step 41 and/or after the main alarm output step 51 before the detection step 47.

Further variants of the embodiment shown in FIG. 2 may also result from the question how a detected positional change is responded to in the monitoring mode 35 in the decision step 39 that is not within the first range of significance, but is within the second range of significance and how a detected positional change is responded to in the alarm mode 45 in the decision step 49 that is within the first range of significance, but is not within the second range of significance. The first-named case may in particular occur when the minimal value of the first range of significance is smaller than the minimal value of the second range of significance; the second-named case may in particular occur when the maximum value of the first range of significance is smaller than a maximum value of the second range of significance when the second range of significance is upwardly bounded at all.

One of these variants is indicated in FIG. 2 by the arrow that is drawn interrupted between the decision step 39 and the main alarm output step 51. In accordance with such a variant, the main alarm output step 51 of the alarm mode 45 is carried out directly when it is found in the monitoring mode 35 in the decision step 39 that a detected positional change is not within the first range of significance, but is within the second range of significance (2).

Provision may alternatively or additionally be made as further variants that an arrow starts from the decision step 49 in the alarm mode 45 that is followed when it is determined that a detected positional change is within the first range of significance, but not within the second range of significance.

This further arrow, not shown, may then either lead to the main alarm output step 51 as in the case of a positional change to be associated with the second range of significance; or it may lead to the pre-alarm output step 41; or, in a similar manner to the embodiment shown in FIG. 2, it may lead to the start of the alarm mode 45, in particular to decision step 43, with then, however, unlike a sub-threshold positional change that is neither within the first range of significance nor within the second range of significance, the predefined time period taken into account in the decision step 43 may be reset, that is it is no longer related to the actually last output of an alarm signal, but starts new.

The respective occurrence of loud and disturbing false alarms may be reduced by the embodiments disclosed herein. For either no detected positional change of the alarm apparatus 11 directly results in the output of a main alarm, but always first to the output of a pre-alarm; or (in accordance with the variant shown by the arrow drawn interrupted in FIG. 2) a main alarm is only directly triggered when the detected positional change is particularly large. In both cases, the response to detected positional changes is more differentiated than when only a single threshold value had been provided above which every positional change would result in the same loud and long-lasting main alarm. Random and slight and/or brief influences on the alarm apparatus 11 may in particular only result in the output of a pre-alarm that is less disturbing in comparison with the main alarm, without a main alarm still necessarily subsequently being triggered. False alarms are thus admittedly not completely precluded, but the probability that they result in a comprehensive main alarm is reduced. It simultaneously remains ensured by the pre-alarm that possibly unauthorized influences on the secured movable object is reliably responded to substantially immediately, albeit also in an initially reduced manner.

The invention claimed is:

1. A mobile alarm apparatus for releasable fastening to a movable object, comprising:
    a detection apparatus that detects positional changes of the mobile alarm apparatus;
    an output apparatus that outputs an alarm signals; and
    a control apparatus that controls the output apparatus in dependence on detected positional changes, the control apparatus is operable in a monitoring mode and in an alarm mode,
    wherein in the monitoring mode the control apparatus is configured:
        to control the output apparatus to output a pre-alarm and to change into the alarm mode when a detected positional change is within a first range of significance; and
    wherein in the alarm mode the control apparatus is configured:
        to change into the monitoring mode when a predefined time period has elapsed since a last output of an alarm signal; and
        to control the output apparatus to output a main alarm different from the pre-alarm when a detected positional change is within a second range of significance.

2. The mobile alarm apparatus in accordance with claim 1, wherein the main alarm has a different volume, pitch and/or modulation frequency than the pre-alarm.

3. The mobile alarm apparatus in accordance with claim 1, wherein the main alarm has a larger duration, volume, pitch and/or modulation frequency than the pre-alarm.

4. The mobile alarm apparatus in accordance with claim 1, wherein the detected positional change is considered to be within the first range of significance when a measured value corresponding to the detected positional change is larger than or no smaller than a minimal value of the first range of significance, and the detected positional change is considered to be within the second range of significance when a measured value corresponding to the detected positional change is larger than or no smaller than a minimal value of the second range of significance.

5. The mobile alarm apparatus in accordance with claim 4, wherein the measured value is an angular value.

6. The mobile alarm apparatus in accordance with claim 4, wherein the minimal value of the first range of significance is smaller than the minimal value of the second range of significance.

7. The mobile alarm apparatus in accordance with claim 4, wherein the first range of significance and the second range of significance mutually overlap.

8. The mobile alarm apparatus in accordance with claim 5, wherein the minimal value of the first range of significance amounts to at least 2° and to at most 10°; and/or wherein the minimal value of the second range of significance amounts to at least 12° and to at most 20°.

9. The mobile alarm apparatus in accordance with claim 1, wherein the detected positional change is considered to be within the first range of significance when a measured value corresponding to the detected positional change is larger than or no smaller than a minimal value of the first range of significance and is smaller than or no larger than a maximum value of the first range of significance, and/or the detected positional change is considered to be within the second range of significance when a measured value corresponding to the detected positional change is larger than or no smaller than a minimal value of the second range of significance and is smaller than or no larger than a maximum value of the second range of significance.

10. The mobile alarm apparatus in accordance with claim 9, wherein the maximum value of the first range of significance corresponds to the minimal value of the second range of significance.

11. The mobile alarm apparatus in accordance with claim 1, wherein the predefined time period after whose elapse the control apparatus changes from the alarm mode into the monitoring mode amounts to 3 seconds or to 5 seconds.

12. The mobile alarm apparatus in accordance with claim 1, wherein the predefined time period after whose elapse the control apparatus changes from the alarm mode into the monitoring mode is dependent on what kind of alarm signal was last output.

13. The mobile alarm apparatus in accordance with claim 1, wherein in the monitoring mode the control apparatus is furthermore configured:
to control the output apparatus to output the main alarm and to change into the alarm mode when a detected positional change is not within the first range of significance, but is within the second range of significance.

14. The mobile alarm apparatus in accordance with claim 1, wherein in the alarm mode the control apparatus is furthermore configured:
to control the output apparatus to output a pre-alarm when the predefined time period since the last output of an alarm signal has not yet elapsed and a detected positional change is within the first range of significance, but not within the second range of significance.

15. The mobile alarm apparatus in accordance with claim 1, wherein the control apparatus is configured to start the monitoring mode subsequent to an activation of the mobile alarm apparatus or subsequent to an activation of the mobile alarm apparatus after an elapse of a predefined waiting time.

16. The mobile alarm apparatus in accordance with claim 15, wherein the predefined waiting time is dependent on a charge state of an energy source of the mobile alarm apparatus.

17. The mobile alarm apparatus in accordance with claim 1, wherein the mobile alarm apparatus further comprises:
a closable fastener that fastens the mobile alarm apparatus to the movable object; and
wherein the control apparatus is configured to start the monitoring mode automatically subsequent to a closing of the closable fastener or subsequent to the closing of the closable fastener after an elapse of a predefined waiting time.

18. The mobile alarm apparatus in accordance with claim 17, wherein the predefined waiting time is dependent on a charge state of an energy source of the mobile alarm apparatus.

19. The mobile alarm apparatus in accordance with claim 1, wherein the control apparatus is furthermore configured to control the output apparatus to output a start signal on the start of the monitoring mode.

20. The mobile alarm apparatus in accordance with claim 1, wherein the movable object is a two-wheeler or a tool.

* * * * *